United States Patent
Blumenthal

(10) Patent No.: US 8,083,468 B2
(45) Date of Patent: Dec. 27, 2011

(54) TURBOMACHINE

(75) Inventor: Roland Blumenthal, Erftstadt (DE)

(73) Assignee: Oerlikon Leybold Vacuum GmbH, Cologne (DE)

(*) Notice: Subject to any disclaimer, the term of this patent is extended or adjusted under 35 U.S.C. 154(b) by 997 days.

(21) Appl. No.: 11/990,074

(22) PCT Filed: Jul. 24, 2006

(86) PCT No.: PCT/EP2006/064576
§ 371 (c)(1),
(2), (4) Date: Feb. 4, 2008

(87) PCT Pub. No.: WO2007/017366
PCT Pub. Date: Feb. 15, 2007

(65) Prior Publication Data
US 2010/0098539 A1    Apr. 22, 2010

(51) Int. Cl.
*F04D 29/48* (2006.01)

(52) U.S. Cl. ............ 415/110; 415/113; 415/170.1; 415/229

(58) Field of Classification Search .......... 415/110, 415/111, 113, 142, 170.1, 229
See application file for complete search history.

(56) References Cited

U.S. PATENT DOCUMENTS

| | | | |
|---|---|---|---|
| 4,641,978 A * | 2/1987 | Kapich | 384/102 |
| 4,806,075 A | 2/1989 | Osterstrom et al. | 415/170 R |
| 5,152,679 A | 10/1992 | Kanemitsu et al. | 417/423.4 |
| 5,231,323 A * | 7/1993 | New | 310/90.5 |
| 5,714,818 A | 2/1998 | Eakman et al. | 310/90.5 |
| 6,071,092 A | 6/2000 | Casaro et al. | 417/423.4 |
| 6,368,082 B1 | 4/2002 | Conrad et al. | 417/423.4 |
| 6,786,642 B2 | 9/2004 | Dubreuil et al. | 384/106 |

FOREIGN PATENT DOCUMENTS

| | | |
|---|---|---|
| DE | 25 24 061 | 12/1976 |
| DE | 199 15 983 | 10/2000 |
| EP | 087 197 | 8/1983 |
| FR | 2 826 076 | 12/2002 |
| GB | 2 294 299 | 4/1996 |
| WO | WO 99/46509 | 9/1999 |

* cited by examiner

*Primary Examiner* — Igor Kershteyn
(74) *Attorney, Agent, or Firm* — Fay Sharpe LLP

(57) ABSTRACT

A high-speed turbomachine includes a magnetic bearing (22, 23) and a retainer bearing for mounting the rotor. The retainer bearing is embodied as a sliding bearing (26, 27) and encompasses a bearing shell (28) at the stator end, a bearing shaft (20) at the rotor end, and an intermediate bushing (30) between the bearing shell (28) and the bearing shaft (20). The intermediate bushing (30) is spaced apart from both the bearing shaft (20) and the bearing shell (28) by a circular gap (33, 34). The intermediate bushing (30) is rotatable relative to the bearing shell (28) and the bearing shaft (20). As a result of this design, the sliding bearing (26) is provided with two pairs of sliding surfaces, onto which all occurring dynamic forces are distributed such that wear is significantly reduced, thus allowing sliding bearings to be used as retainer bearings in a magnetically mounted high-speed turbomachine.

12 Claims, 1 Drawing Sheet

TURBOMACHINE

BACKGROUND

The invention refers to a turbomachine comprising a magnetic bearing and a retainer bearing associated to the magnetic bearing.

Turbopumps, such as turbomolecular pumps and turbo-blowers, for example, rotate at very high speeds of up to 80,000 rotations per minute. Therefore, the rotor is preferably supported in magnetic bearings that are especially well suited for high speeds. In the event that the magnetic bearing or bearings fail, so-called mechanical retainer bearings are provided that are to prevent the pump rotor from contacting and thereby destroying the pump stator should the magnetic bearing fail.

The retainer bearings used for turbomolecular pumps are roller bearings that, in contrast with sliding bearings, are less subject to wear for reasons of their structural principle. However, roller bearings are disadvantageous in that they are relatively expensive and may amount to up to 10% of the overall costs of turbomolecular pumps and turbo-blowers.

In view of the above, it is an object of the invention to provide a magnetically supported turbo machine having an economic retainer bearing.

SUMMARY

In the turbomachine of the present invention, the retainer bearing is not configured as a roller bearing, but as a sliding bearing. An intermediate bushing is arranged between the stator-side bearing shell and the rotor-side bearing shaft of the sliding bearing, the intermediate bushing being spaced from both the bearing shell and the bearing shaft by a circular gap. The intermediate bushing is rotatable with respect to both the bearing shaft and the bearing shell.

Technical problems and prejudices erstwhile opposed the use of a sliding bearing as a retainer bearing of a magnetically supported fast rotating turbomachine. In case of operation, the retainer bearing has to decelerate a very substantial amount of kinetic energy. Moreover, at the beginning of a case of operation, the speed of the bearing shaft possibly is very high with respect to the stator-side bearing shell, namely in the order of 100 m/sec and higher. Together with a relatively great moment of inertia of a pump rotor of a turbomachine, stopping distances of 100 km and longer are caused. The second problem results from the great radial forces occurring in the region of the retainer bearings that may be in the double-digit range of kN. Both conditions together make demands on a retainer bearing configured as a sliding bearing, which are considered impossible to meet with conventional structures.

The retainer bearing in the form of a sliding bearing, is virtually divided into two partial bearings, namely a partial bearing formed by the bearing shaft and the inner side of the intermediate bushing and a second partial bearing formed by the outer side of the intermediate bushing and the bearing shell. The outer circular gap between the intermediate bushing and the bearing shell is as small as possible, yet large enough for the intermediate bushing to remain rotatable with respect to the bearing shell in any circumstance.

In a case of operation, the intermediate bushing is accelerated first by the bearing shaft. At the same time, the bearing bushing is decelerated by the statorside bearing shell. Eventually, a balance of the rotational speeds of the intermediate bushing and the bearing shaft develops. Ideally, the difference between the speed of the intermediate bushing and that of the bearing shell, as well as that of the bearing shaft is almost the same. Due to the rotatability of the intermediate bushing, the braking work is distributed among two pairs of sliding surfaces so that the wear caused thereby is at least reduced by one half. Moreover, the braking effort of the entire sliding bearing is reduced so that the heat development and the risk of a heat accumulation is reduced. The surfaces of the surface pairs are designed such that the braking effort and the braking time are similar to those of roller bearings. Thereby, the heat development is also similar and so low that no overheating occurs.

The intermediate bushing in the sliding bearing reduces the braking distance per pair of sliding surfaces to approximately one half, it further reduces the heat development and slightly dampens radial impacts of the bearing shaft. All effects together allow for the use of a sliding bearing instead of an expensive roller bearing as retainer bearings for a magnetic bearing of a fast rotating gas conveying turbomachine.

A sliding bearing thus constructed is much more economic to manufacture than a corresponding roller bearing. Due to the great share of the costs incurred by the retainer bearings, the overall price of a corresponding turbomachine can be noticeably reduced thereby.

According to a preferred embodiment, springing elements are provided between the intermediate bushing and the bearing shell, which hold the intermediate bushing spaced from the bearing shell. The springing elements fix the intermediate bushing in a defined position within the bearing bushing. Moreover, they dampen radial impacts from the bearing shaft when the same strikes against the intermediate bushing. In addition, the springing elements may also have damping properties.

The radial forces which, in case of operation, are transferred from the bearing shaft to the intermediate bushing are very high. Further, the contact surface between the bearing shaft and the intermediate bushing or between the intermediate bushing and the bearing shell are not extensive, but linear at most or even only point-shaped, which is due to the possible inclined orientation of the bearing shaft with respect to the intermediate bushing and of the intermediate bushing to the bearing shell. Thus, very high area loads are generated. By providing springing elements between the bearing shells and the intermediate bushing, the radial impact movements of the bearing shaft are absorbed so that the area forces occurring are reduced significantly. This also reduces the overall wear of the sliding bearing.

According to a preferred embodiment, the gap height of the outer gap between the bearing shell and the intermediate bushing is substantially smaller than the gap height of the inner gap between the bearing shaft and the intermediate bushing. The inner gap has the same function and therefore also has the same gap height as the bearing gap of conventional retainer bearings. The inner gap represents the operating range of the magnetic bearing.

The outer, additional gap allows for a rotational relative movement between the intermediate bushing and the bearing shell. This requires no particularly high gap. The smaller the gap height of the outer gap, the less the intermediate bushing can tilt with respect to the bearing shell. This again ensures impact angles as small as possible between the bearing shell and the intermediate bushing, as well as between the intermediate bushing and the bearing shaft. Moreover, with a small gap height of the above outer gap, the gap size between the pump rotor and stator can also be kept small.

Preferably, the intermediate bushing is formed integrally and from metal. In this manner, a still economic solution for a sliding retainer bearing can be offered in contrast with costly ceramic sliding bearings of a conventional structure.

The following is a detailed description of an embodiment of the invention with reference to the drawings.

DETAILED DESCRIPTION

Figure 1:
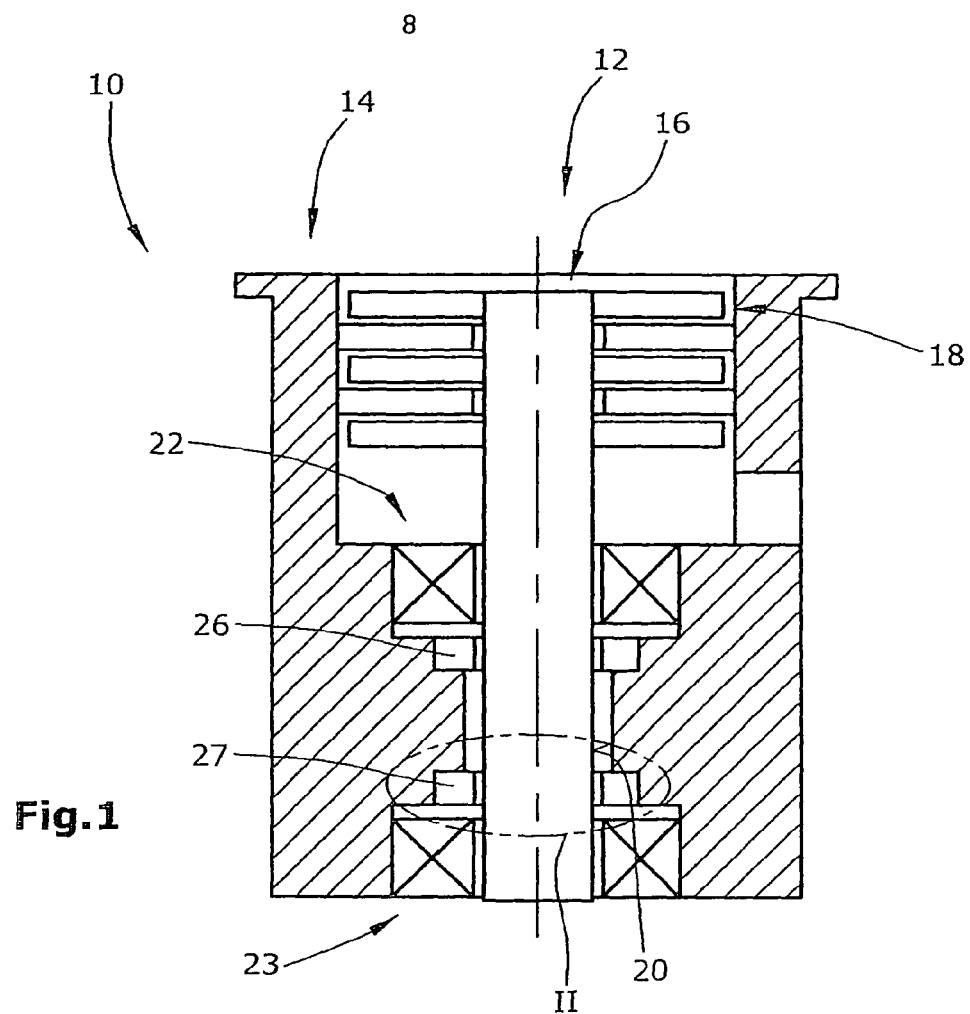
FIG. 1 shows a turbomachine designed as a turbomolecular pump, having two magnetic bearings, each with a retainer bearing.
Figure 2:
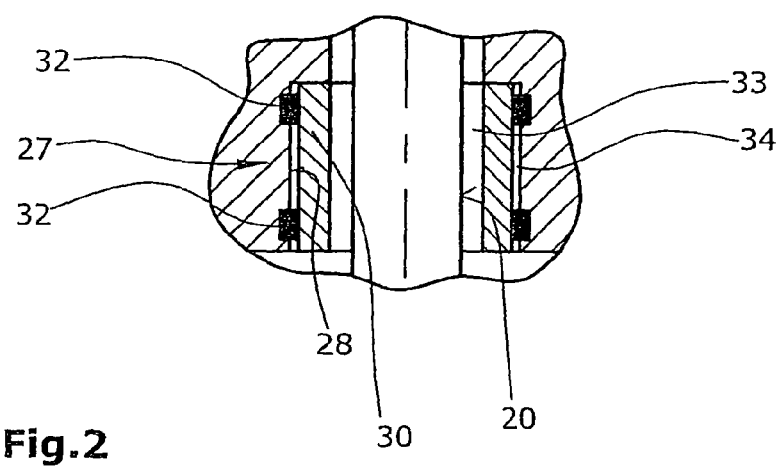
FIG. 2 is an enlarged illustration of a retainer bearing of the turbomachine of FIG. 1.

FIGS. 1 and 2 illustrate a fast rotating turbomachine 10 designed as a turbomolecular pump and comprising a rotor 12 and a stator 14. The rotor 12 includes a shaft 16 with a pump rotor 18, a shaft portion forming a bearing shaft 20 in the region of the support of the shaft. The Bearing shaft 20 forms the rotor-side part of two magnetic bearings 22, 23, as well as of the sliding bearings 26, 27 arranged axially between the two magnetic bearings 22, 23 and serving as retainer bearings for the two magnetic bearings 22, 23.

The sliding bearings 26, 27 are each formed by the bearing shaft 20, a stator-side bearing shell 28 and a cylindrical intermediate bushing 30 arranged radially between the bearing shell 28 and the bearing shaft 20. The bearing shell 28, the intermediate bushing 30, as well as the bearing shaft 20 are made of metal. The intermediate bushing 30 is supported through metal springing elements 32 in a fixed relationship with the bearing shell 28.

The intermediate bushing 30 is supported rotatably both with respect to the bearing shell 28 and to the bearing shaft 20. Between the intermediate bushing 30 and the bearing shaft 20, a circular cylindrical gap 33 is present which has a gap width of about 0.2 mm that allows for the tolerance of the bearing shaft 20 required for the magnetic bearing in normal operation. The outer gap 34 between the intermediate bushing 30 and the bearing shell 28 has a smaller radial gap width of about 0.02 mm. The outer gap 34 only has to be as large as to just guarantee the rotatability of the intermediate bushing 30 with respect to the bearing shell 28 in all thermal conditions.

In contrast with conventional sliding bearings, the sliding bearing 26 comprises two pairs of sliding surfaces onto which the entire braking work and all of the bearing abrasion is distributed. Thus, it is possible to reduce in particular stresses in the form of heat, impacts and abrasion such that the use of an economic sliding bearing as a retainer bearing in a fast rotating, gas conveying turbomachine is possible.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A turbomachine comprising:
    a magnetic bearing; and
    a mechanical retainer bearing, the retainer bearing being configured as a sliding bearing and including:
        a stator-side hearing shell,
        a rotor-side bearing shaft, and
        an intermediate bushing arranged between the bearing shell and the bearing shaft, and being spaced radially from both the bearing shaft and the bearing shell by annular gaps, the intermediate bushing being rotatable with respect to the bearing shell and the bearing shaft.

2. The turbomachine of claim 1, further including:
    springing elements arranged between the intermediate bushing and the bearing shell, to keep the intermediate bushing spaced from the bearing shell.

3. The turbomachine of claim 1, wherein the gap between the bearing shell and the intermediate bushing is smaller than the gap between the intermediate gap bushing and the bearing shaft.

4. The turbomachine of claim 1, wherein the intermediate bushing is integral and made of metal.

5. A retainer bearing for turbomachine of claim 1.

6. A retainer bearing for a turbomachine, the retained bearing comprising:
    a stator-side bearing shell,
    a rotor-side bearing shaft, and
    an intermediate bushing arranged between the bearing shell and the bearing shaft, and being spaced radially from both the bearing shaft and the bearing shell by annular gaps, the intermediate bushing being rotatable with respect to the bearing shell and the bearing shaft.

7. A turbomachine comprising:
    a stator;
    at least one magnetic bearing supported in the stator;
    a rotor including a rotor shaft rotatably received in the magnetic bearing;
    a sleeve bearing which rotatably supports the rotor in the event of a failure of the magnetic bearing, the sleeve bearing including:
        an annular bushing rotatably mounted in the stator surrounding the rotor shaft, the annular bushing being spaced from the rotor shaft such that the bushing does not contact the rotor shaft when the magnetic bearing is functioning.

8. The turbomachine of claim 7, wherein in the event of the failure of the magnetic bearing, the rotor shaft slideably engages the bushing and the bushing slidably engages the stator such that the rotor shaft rotates relative to the bushing and the bushing rotates relative to the stator.

9. The turbomachine of claim 8, wherein the frictional interaction between the rotor shaft and the bushing and frictional interaction between the bushing and the stator brings the rotor to a stop.

10. The turbomachine of claim 9, wherein the bushing is configured and mounted relative to the rotor shaft and the stator such that the frictional interaction and associated heat generation between the shaft and the bushing balances the frictional interaction and associated heat generation between the bushing and the stator.

11. The turbomachine of claim 7, wherein a gap between the bushing and stator is smaller than a gap between the bushing and the rotor shaft.

12. The turbomachine of claim 7, wherein the stator includes:
    a bearing shell disposed adjacent the bushing.

* * * * *